(12) United States Patent
Van Steenburg

(10) Patent No.: US 10,751,829 B2
(45) Date of Patent: Aug. 25, 2020

(54) HAND HELD ARC WELDING ROD HOLDER WITH INTEGRAL ARC WELDING LEAD CONTACT AND AUTOMATIC ARC WELDING ROD FEED MECHANISM

(71) Applicant: Michael Van Steenburg, Garden Ridge, TX (US)

(72) Inventor: Michael Van Steenburg, Garden Ridge, TX (US)

( * ) Notice: Subject to any disclaimer, the term of this patent is extended or adjusted under 35 U.S.C. 154(b) by 291 days.

(21) Appl. No.: 15/819,080

(22) Filed: Nov. 21, 2017

(65) Prior Publication Data

US 2018/0141150 A1   May 24, 2018

Related U.S. Application Data

(60) Provisional application No. 62/425,956, filed on Nov. 23, 2016.

(51) Int. Cl.
*B23K 9/28* (2006.01)

(52) U.S. Cl.
CPC ............... *B23K 9/28* (2013.01); *B23K 9/282* (2013.01)

(58) Field of Classification Search
CPC ........................................................ B23K 9/28
USPC ................................................. 219/138–480
See application file for complete search history.

(56) References Cited

U.S. PATENT DOCUMENTS

| 1,462,431 A * | 7/1923 | Wagner | B23K 3/0307 219/234 |
|---|---|---|---|
| 1,462,620 A * | 7/1923 | Peeler | B23K 9/282 403/4 |
| 1,677,306 A * | 7/1928 | Stancliff | B23K 9/282 219/138 |
| 1,865,003 A * | 6/1932 | Hall | B23K 9/282 219/138 |
| 2,310,020 A * | 2/1943 | Gallo | B23K 9/282 219/141 |
| 2,347,880 A * | 5/1944 | Budd | B23K 9/282 219/138 |
| 2,364,508 A * | 12/1944 | Bernard | B23K 9/282 219/142 |
| 2,389,569 A * | 11/1945 | Wagner | B23K 9/282 219/138 |
| 2,395,214 A * | 2/1946 | Bourque | B23K 9/28 219/142 |
| 2,540,204 A * | 2/1951 | Holslag | B23K 9/282 219/141 |
| 2,604,568 A * | 7/1952 | Peyreferry | B23K 9/282 219/138 |

(Continued)

*Primary Examiner* — Lori L Baker

(74) *Attorney, Agent, or Firm* — Ryan Loveless

(57) ABSTRACT

According to an embodiment of the disclosure, a welding rod holder comprises a body, an electrical contact tip, a slider, and a biasing mechanism. The body has a lower end and an upper end. The electrical contact tip is coupled to the body and is configured to electrically contact a welding rod. The slider is configured to allow the welding rod to move with respect to the body. The biasing mechanism is configured to move the welding rod out of a lower end of the body. The hand brake is configured to selectively allow the biasing mechanism to move the welding rod out of a lower end of the body. The movement of the welding rod out of a lower end of the body is configured to allow a substantially similar distance between the body and a welding work as the welding rod is exhausted.

14 Claims, 3 Drawing Sheets

(56) References Cited

U.S. PATENT DOCUMENTS

| | | | | |
|---|---|---|---|---|
| 2,870,324 | A * | 1/1959 | Albert | B23K 9/282 219/143 |
| 2,885,535 | A * | 5/1959 | Forseth | B23K 9/282 219/143 |
| 2,889,447 | A * | 6/1959 | Runkel | B23K 9/282 219/142 |
| 2,922,027 | A * | 1/1960 | Dumais | B23K 9/282 219/138 |
| 2,976,396 | A * | 3/1961 | Booher | B23K 9/282 219/138 |
| 3,104,640 | A * | 9/1963 | Sporck | B21D 22/16 72/14.6 |
| 3,493,719 | A * | 2/1970 | Cribb | B23K 9/282 219/142 |
| 3,596,052 | A * | 7/1971 | Smith | B23K 9/28 219/138 |
| 3,739,140 | A * | 6/1973 | Rotilio | B23K 9/28 219/144 |
| 3,828,160 | A * | 8/1974 | Greer | B23K 9/282 219/141 |
| 4,174,062 | A * | 11/1979 | Francis | B23K 9/32 15/105 |
| 4,588,252 | A * | 5/1986 | Ice | B23K 9/26 439/724 |
| 5,585,022 | A * | 12/1996 | Driscoll, Sr. | B23K 9/287 219/138 |
| 6,940,041 | B2 * | 9/2005 | Zamuner | B23K 9/28 219/136 |
| 9,199,329 | B2 * | 12/2015 | Kettunen | B23K 9/167 |
| 9,839,492 | B2 * | 12/2017 | Wong | A61C 1/148 |

* cited by examiner

HAND HELD ARC WELDING ROD HOLDER WITH INTEGRAL ARC WELDING LEAD CONTACT AND AUTOMATIC ARC WELDING ROD FEED MECHANISM

PRIORITY

This application claims priority to Provisional Application No. 62/425,956 filed on Nov. 23, 2016.

TECHNICAL FIELD

This disclosure is generally directed to machining technologies. More specifically, this disclosure is directed to a hand-held arc welding rod holder with integral arc welding lead contact and automatic arc welding rod feed mechanism.

BACKGROUND

In a conventional arc welding process, a welding rod is held using a clamp at the opposite end of the arc welding rod from where the welding process occurs. This arrangement creates an awkward ergonomic welding process for the user which results in a less than desirable quality finished weld.

BRIEF DESCRIPTION OF THE DRAWINGS

For a more complete understanding of this disclosure and its features, reference is now made to the following description, taken in conjunction with the accompanying drawings, in which.

SUMMARY OF THE DISCLOSURE

Figure 1A:
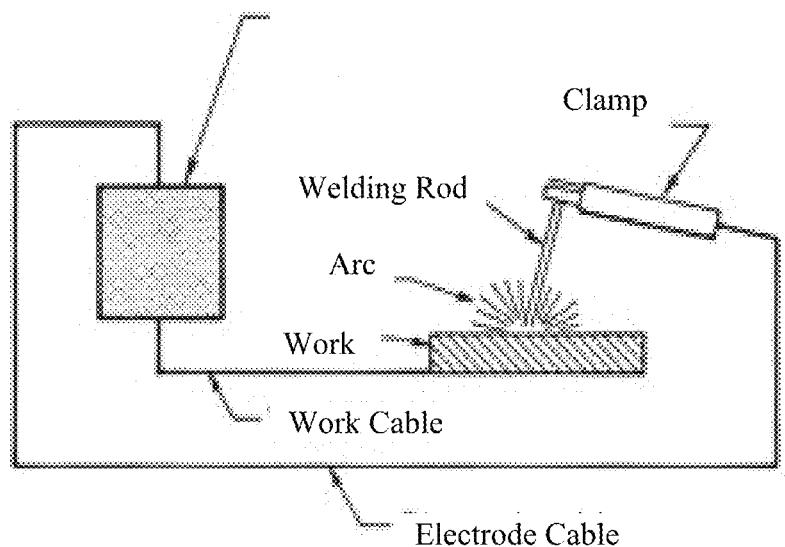
FIG. 1A shows a schematic of a conventional arc welding process to provide context for certain embodiment of the disclosure.

According to an embodiment of the disclosure, a welding rod holder comprises a body, an electrical contact tip, a slider, and a biasing mechanism. The body has a lower end and an upper end. The electrical contact tip is coupled to the body and is configured to electrically contact a welding rod. The slider is configured to allow the welding rod to move with respect to the body. The biasing mechanism is configured to move the welding rod out of a lower end of the body. The hand brake is configured to selectively allow the biasing mechanism to move the welding rod out of a lower end of the body. The movement of the welding rod out of a lower end of the body is configured to allow a substantially similar distance between the body and a welding work area as the welding rod is exhausted.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. The phrase "at least one of," when used with a list of items, means that different combinations of one or more of the listed items may be used, and only one item in the list may be needed. For example, "at least one of: A, B, and C" includes any of the following combinations: A; B; C; A and B; A and C; B and C; and A and B and C. Definitions for certain words and phrases are provided throughout this patent document, those of ordinary skill in the art should understand that in many if not most instances, such definitions apply to prior, as well as future uses of such defined words and phrases.

DETAILED DESCRIPTION

The FIGURES described below, and the various embodiments used to describe the principles of the present disclosure in this patent document are by way of illustration only and should not be construed in any way to limit the scope of the disclosure. Those skilled in the art will understand that the principles of the present disclosure invention may be implemented in any type of suitably arranged device or system. Additionally, the drawings are not necessarily drawn to scale.

It will be understood that well known processes and components have not been described in detail and have been omitted for brevity. Although specific steps, structures and materials may have been described, the present disclosure may not be limited to these specifics, and others may be substituted as it is well understood by those skilled in the art, and various steps may not necessarily be performed in the sequences shown.

In a conventional arc welding process, a welding rod is held using a clamp at the opposite end of the arc welding rod from where the welding process occurs. This arrangement creates an awkward ergonomic welding process for the user which results in a less than desirable quality finished weld. Exacerbating the awkwardness, the distance from a weld location varies—starting with a full length of the welding rod and shortening as the weld rod is exhausted. Such a varied distance combined with unnatural positioning of a users' hand unfortunately leads to inaccuracy in a finished weld.

Recognizing such problems, embodiments of the disclosure improve upon such conventional arc welding processes by moving the control point of the user down near where the welding process is performed, while protecting the user from coming into contact electrically with the welding process and enabling the welding rod to be introduced into the welding area automatically and at a rate that is directly articulated by the user. According to certain embodiments, the distance from the weld location doesn't vary. And, according to certain configurations, the welding rod holder may be held in a more natural and position like a pencil.

Figure 1B:
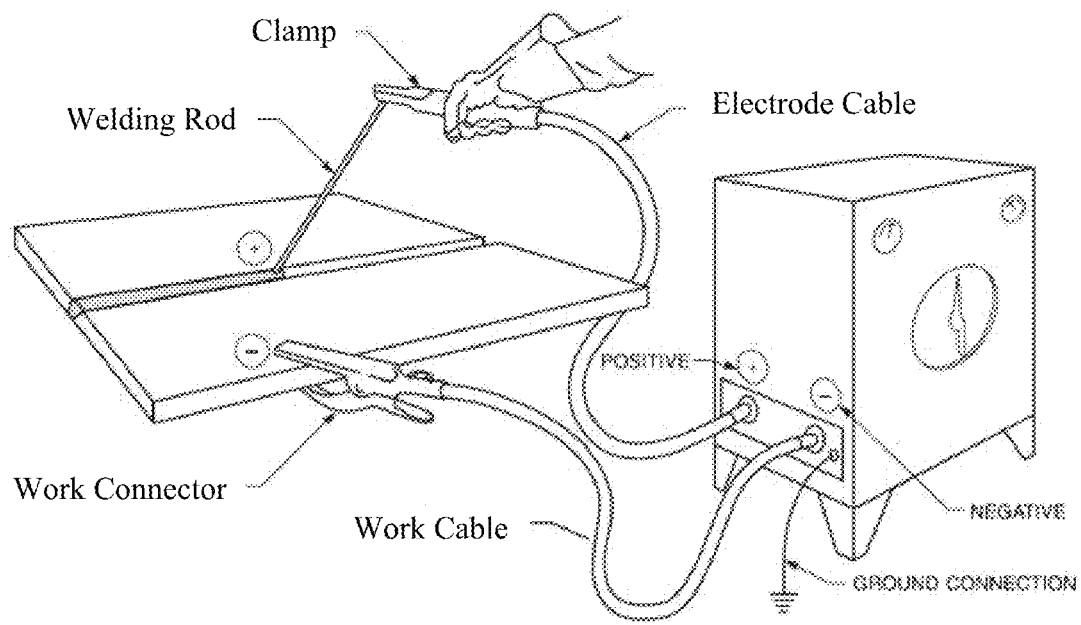
FIG. 1B shows a schematic of a conventional arc welding process to provide context for certain embodiment of the disclosure.

FIGS. 1A and 1B shows a conventional arc welding process to provide context for certain embodiment of the disclosure. FIG. 1A provides a schematic whereas FIG. 1B provides an illustration. While components in one conventional arc welding process are shown, artisans will recognize after review of this disclosure that embodiments described herein can be used in other contexts.

With reference to FIGS. 1A and 1B, the conventional arc welding process has a welding machine (AC or DC power), a work cable, an electrode cable, a clamp, a welding rod, a work, and the resultant arc are shown. As described earlier, a welder holding the clamp works at least the distance of the welding rod from the working area, holding the clamp in an underhanded manner. As the welding rod is exhausted, the welder begins to work closer and closer to the work and must adjust to the varied and diminishing distance.

Figure 2:
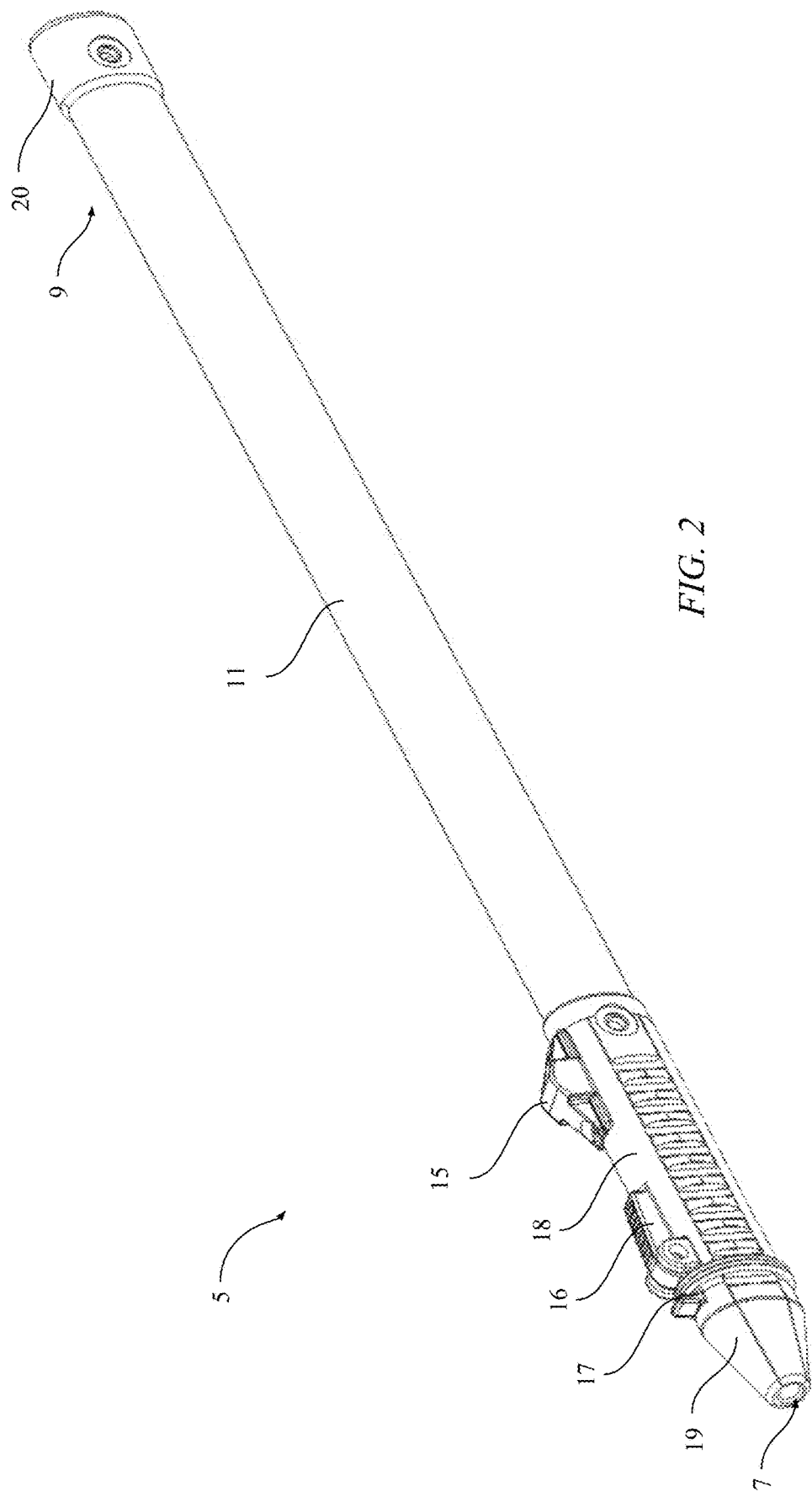
FIG. 2 show a perspective view of the welding rod holder, according to an embodiment of the disclosure.
Figure 3:
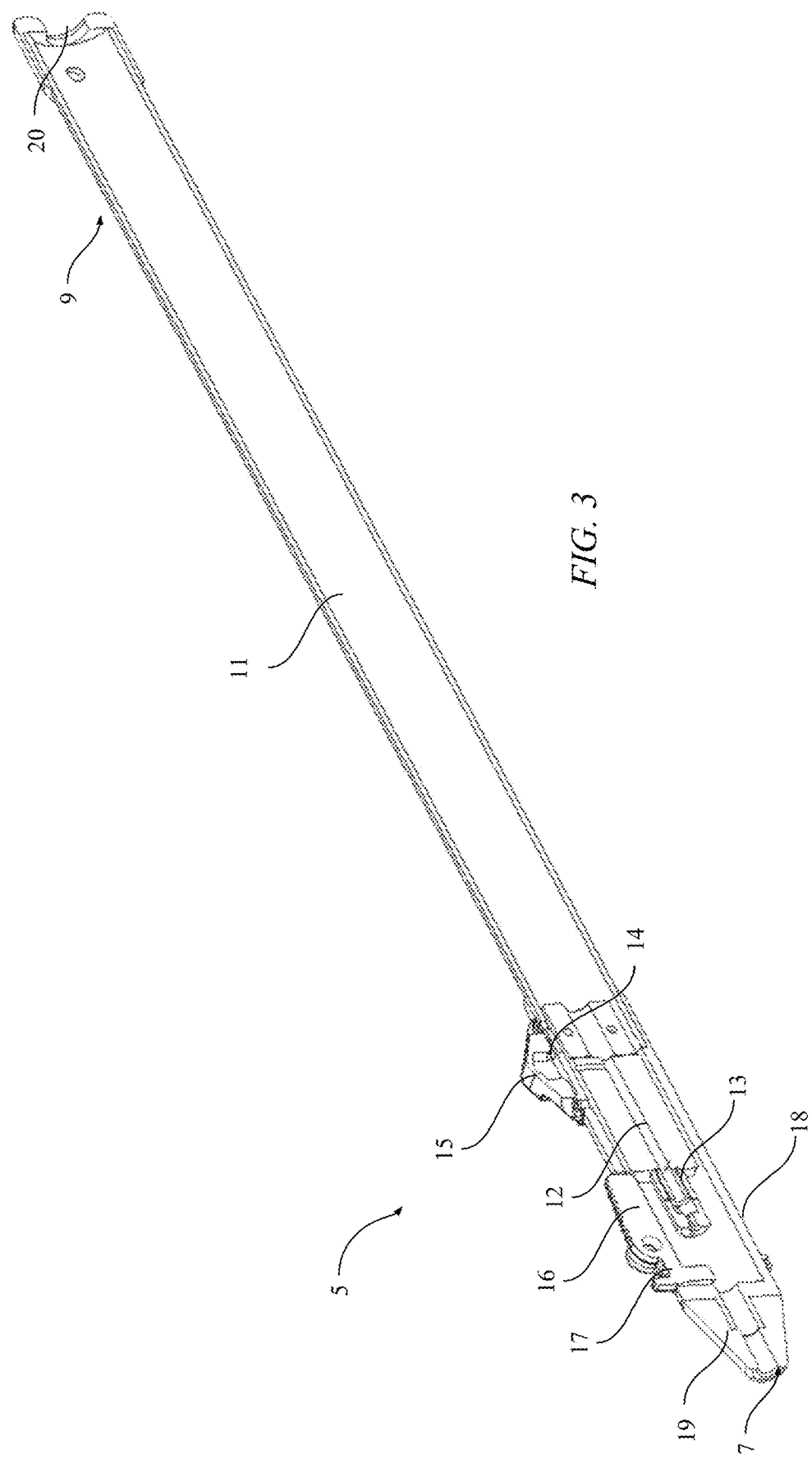
FIG. 3 shows a cutaway of the welding rod holder of FIG. 2 to show internal components.

FIGS. 2 and 3 show a welding rod holder 5, according to an embodiment of the disclosure. In particular, FIG. 2 show a perspective view of the welding rod holder 5 whereas FIG. 3 shows a cutaway of the welding rod holder 5 of FIG. 2 to show internal components. Although particular components are shown in FIGS. 2 and 3, after review of the specification, artisans will recognize that variations may be made without departing from the spirit of the disclosure.

The configuration of FIGS. 2 and 3 can be used in the same contextual setting of FIGS. 1A and 1B by replacing the welding rod holder. Contrasting with conventional designs, the welding rod holder 5 of FIGS. 2 and 3 moves the location of the users hand down close to the end of the arc welding rod which is being used in the welding process, thereby increasing the comfort of the user and improving the quality of the weld. The quality can additionally be improved because of a non-varied distance between the welding rod holder 5 and work.

With reference to FIGS. 2 and 3, the welding rod holder 5 is shown with a hollow welding rod tube 11, an electrical contact slider 12, an electrical contact tip 13, a biasing mechanism 14, a biasing mechanism housing 15, a finger brake 16, finger break tension bands 17, a hand holder body 18, a welding tool tip 19, and a welding lead feed bushing 20. The welding rod holder also generally has a lower end 7 and an upper end 9. As described in more detail below, the lower end 7 is the closest to the work whereas upper end 9 has components to receive the electrode cable of FIGS. 1A and 1B.

The hollow welding rod tube 10 has sufficient length to fully contain an unused welding rod completely inside along with the electrical contact from the welder lead (e.g., electrode cable of FIGS. 1A and 1B).

The electrical contact slider 12 enables the electrical current to pass from the welder lead to the electrical contact tip 13 that the welding rod is inserted into. In operation, as described more fully below, the electrical contact slider slides back and forth in the hollow welding rod tube while the welding rod is ejected and exhausted.

The electrical contact tip 13 enables the welding rod to be inserted into and make electrical contact between the electrical contact slider 12 and the electrical lead from the welder. The electrical contact tip 13 slides with the electrical contact slider 12.

The biasing mechanism 14 biases the welding rod out of the lower end 7, for example, out of the welding tool tip 19. The biasing mechanism 14 can be any suitable component to enable such biasing. In particular configurations, the biasing mechanism may be a continuous tension coil spring that is unwound when the welding rod is pushed up inside the hollow welding rod tube 11 while the finger brake 16 is in the off position. In other configurations, the biasing mechanism 14 may be compression spring positioned inside the welding rod tube 11 that compresses when the welding rod is inserted. An expansion force of such a compression spring ejects welding rod out of the welding tool 19 when selective activated (e.g., with the finger brake in certain configurations). In yet another configuration, the biasing mechanism 14 may be power screws that when selectively activated (e.g., with the finger brake in certain configurations) ejects the welding rod. Although some examples have been provided, one of ordinary skill in the art will recognize that other examples of biasing mechanism may be used with the scope of the present disclosure including, but not limited to those using energy stored in springs, electricity, air and other fluids.

The biasing mechanism component 15 facilitates biasing. In the configuration shown in FIGS. 2 and 3, the biasing mechanism component is a housing that contains a continuous tension coil spring (the biasing mechanism 14) that enables the coil spring to become unwound and rewound due to the inherent tension in the coil spring. In other configurations, (e.g., where the biasing mechanism is a compression spring), the biasing mechanism component may assist with the compression of the spring upon insertion of a welding rod tube.

The finger break 16 is a switch to release the welding rod from the welding rod holder 5. In the configuration of FIGS. 2 and 3, the finger brake 16 creates friction on the welding rod and thereby prevents the welding rod from moving out of the operating end (end near the welding tool tip 19) of the hollow welding rod tube 11 unless the finger brake 16 is moved to the off position by the user's finger actuation. While a feed upon activation mechanism is shown, the contrary feed until activated may be used in other configurations.

In other configurations, the finger brake 16 may actuate power screws to eject the welding rod. In yet other configurations, the finger break may actuate an automatic feed mechanism. For example, according to one configuration, a sensor may monitor the length of welding rod outside of the welding tool tip 19 on the lower end 7 and automatically feed additional welding rod out of the welding tool tip 19 when the sensed length goes under the threshold. Such a threshold may be modified in certain configurations. Suitable sensors include those using reflected light (e.g., a laser or thermal imaging) or the electrical resistance over the length of welding rod exposed.

The finger brake tension bands 17 in this configuration are a biasing mechanism used in conjunction with the finger break 16. The finger break tension bands 17 may be made of elastic bands or garter springs that force the finger brake 16 to push down onto the welding rod and create the friction that prevents the welding rod from moving out of the operating end of the hollow welding rod tube unless the finger brake is pressed or articulated by the user. Finger brake tension on the welding rod may also be maintained by a cantilevered leaf spring.

The hand holder body 18 contains the finger brake 16, the electrical contact slider 12, the electrical contact tip 13, and the biasing mechanism 14. The hand holder body 18 also has the biasing mechanism housing 15 and finger brake tension bands 17 attached thereto. The hand holder body 18 is ergonomically designed such that the user can operate the finger brake 16 with a gloved hand that protects the users hand from the electrical arc during the welding process.

The welding tool tip 19 is made of a material such as ceramic or plastic that deflects the heat from the welding process away from the hand holder body and through which the welding rod passes through to reach the welding area.

The welding lead feed bushing 20 is located at the upper end of the hollow welding rod tube that enables the welder lead to smoothly travel in and back out of the hollow welding rod tube as the electrical contact slider 12 moves up and down the inside of the hollow welding rod tube while the welding rod is being loaded or during the welding process while the user is enabling the welding rod to advance into the welding area during the welding process.

In operation of the configuration of FIGS. 2 and 3, a user will attach the welder lead (e.g., electrical cable of FIG. 1)

to the electrical contact slider 12. The user presses down on the finger brake 16 and slides a new welding rod up inside of the welding tip 10, hand holder body 18, and hollow welding tube 11 and into the electrical contact tip 13 and electrical contact slider 12. The insertion of the new welding rod as described above engages the biasing mechanism 18. The biasing mechanism 18 provides the force needed to move the welding rod out of the hand holder body 18, the hollow welding tube 11, and through the welding tool tip 19 when finger brake 16 is pressed and therefore in the off position when desired by the user. The electrical contact slider 12 is moving up and down inside the hollow welding rod tube 11. The welder lead is moving in and out of the upper end which is aided by the welder lead feed bushing 20.

Once a user has clamped the ground lead (e.g., work cable of FIG. 1) from the welder to the metal to be welded and turned the arc welding machine on, the user will place the lower end 7 with exposed portion of welding rod showing, down close to the area to be welded and then press the finger brake 16 to release the welding rod and make an arc to begin the welding process. As the welding rod is consumed by the welding process, the user will continue to press the finger brake 16 and allow the welding rod to feed down into the weld pool while they move the welding rod holder 5 along the desired path they wish to weld along. The process is much like drawing a line on a piece of paper with an automatic pencil.

Additional finger brake tension bands or cantilevered leaf springs may be added or subtracted based on the desired finger actuation force by the user. Additionally, larger hole diameter welding tool tips and/or electrical contact tips could be used to accommodate different diameter welding rods.

Additional components could be incorporated within the hollow welding rod tube that could obviate the need for the welder lead to slide in and out of the hollow welding rod tube such as a sliding electrical contact mechanism.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A welding rod holder comprising:
    a body having a lower end and an upper end;
    an electrical contact tip coupled to the body, the electrical contact tip configured to electrically contact a welding rod;
    a slider configured to allow the welding rod to move with respect to the body;
    a biasing mechanism configured to move the welding rod out of a lower end of the body;
    a hand brake configured to selectively allow the biasing mechanism to move the welding rod out of a lower end of the body; and
    wherein the movement of the welding rod out of a lower end of the body is configured to allow a substantially similar distance between the body and a welding work as the welding rod is exhausted.

2. The welding rod holder of claim 1, wherein at least a portion of the body is configured to ergonomically be held like a pencil during welding work.

3. The welding rod of claim 1, wherein the body further comprises:
    a hollow welding rod tube; and
    a welding tool tip proximate the lower end of the body, the welding tool tip configured to initially receive the welding rod, and the welding rod tube configured to hold the slider and the welding rod tube prior to the biasing mechanism moving the welding rod out of the lower end of the body back through the welding tool tip.

4. The welding rod of claim 3, the body further comprising:
    a welding lead feed bushing located at the upper end, the welding lead feed bushing configured to allow a welder lead to smoothly travel in and back out of the hollow welding rod tube as the slider moves up.

5. The welding rod of claim 3, wherein the welding tool tip is made of ceramic or plastic material.

6. The welding rod of claim 1, wherein the biasing mechanism is a spring.

7. A welding rod holder comprising:
    a body have a lower end and an upper end;
    an electrical contact tip coupled to the body, the electrical contact tip configured to electrically contact a welding rod;
    a slider configured to allow the welding rod to move with respect to the body; and
    a biasing mechanism configured to move the welding rod out of a lower end of the body.

8. The welding rod holder of claim 7, wherein the movement of the welding rod out of a lower end of the body is configured to allow a substantially similar distance between the body and a welding work as the welding rod is exhausted.

9. The welding rod holder of claim 7, further comprising:
    a hand brake configured to selectively allow the biasing mechanism to move the welding rod out of a lower end of the body.

10. The welding rod holder of claim 7, wherein at least a portion of the body is configured to ergonomically be held like a pencil during welding work.

11. The welding rod of claim 7, wherein the body further comprises:
    a hollow welding rod tube; and
    a welding lead feed bushing located at the upper end, the welding lead feed bushing configured to allow a welder lead to smoothly travel in and back out of the hollow welding rod tube as the slider moves up.

12. The welding rod of claim 11, the body further comprising:
    a welding lead feed bushing located at the upper end, the welding lead feed bushing configured to allow a welder lead to smoothly travel in and back out of the hollow welding rod tube as the slider moves up.

13. The welding rod of claim 11, wherein the welding tool tip is made of ceramic or plastic material.

14. The welding rod of claim 7, wherein the biasing mechanism is a spring.

* * * * *